Patented Jan. 2, 1940

2,185,709

UNITED STATES PATENT OFFICE 2,185,709

PRODUCTION OF AMINOANTHRAQUINONE COMPOUNDS

James Ogilvie, Buffalo, and Richard S. Wilder, Hamburg, N. Y., assignors to National Aniline & Chemical Company, Inc., New York, N. Y., a corporation of New York No Drawing. Application June 28, 1938, Serial No. 216,288

17 Claims. (Cl. 260—378)

This invention relates to an improvement in the process for the manufacture of aminoanthraquinone compounds, and more particularly to an improvement in the oxidation step of the process of preparing aminoanthraquinone compounds which contain an unsubstituted or a substituted amino radical in the 1-position and an amino radical of this class or a hydroxyl radical in the 4-position of the anthraquinone nucleus from leuco - 1, 4 - dihydroxyanthraquinone compounds and leuco-1,4-diaminoanthraquinone compounds. These aminoanthraquinone compounds may be free from further substituents or may contain additional substituents in the 5-, 6-, 7-, or 8- positions of the anthraquinone nucleus.

Aminoanthraquinone compounds of the above class are valuable products, being useful as dyes and as intermediates in the production of dyes. Thus, 1,4-diaminoanthraquinone compounds in which the amino radicals are unsubstituted or contain alkyl radicals (i. e., aliphatic chains, cycloalkyl radicals or aralkyl radicals) are among the most valuable dyestuffs for the coloring of materials comprising organic derivatives of cellulose (such as, acetyl cellulose); and the 1,4-diaminoanthraquinone compounds in which at least one of the amino radicals contains an aryl radical are valuable as intermediates; e. g., upon sulfonation, they yield acid wool dyestuffs.

An important process for the manufacture of these aminoanthraquinone compounds involves reacting a leuco-1,4-dihydroxyanthraquinone compound, such as leuco-quinizarine, with ammonia or with an amine such as an alkylamine, arylamine, or a heterocyclic amine so as to replace one or both of the hydroxyl radicals with a substituted or unsubstituted amino radical. For example, when it is desired to obtain a 1-alkylamino-4-hydroxyanthraquinone compound, the leuco-quinizarine or other leuco-1,4-dihydroxyanthraquinone compound can be reacted with a mono-molecular proportion of an alkylamine containing at least two carbon atoms to replace one hydroxyl radical with the residue of the amine. Also, unsymmetrical 1,4-di(alkylamino)-anthraquinone compounds can be prepared by reacting a leuco-1,4-dihydroxyanthraquinone compound successively with different alkylamines corresponding to the alkylamino radicals which it is desired to substitute for the hydroxyl radicals in the 1- and 4-position of the anthraquinone nucleus as disclosed in U. S. Patent 2,112,258. 1,4-diaminoanthraquinone compounds and 1-amino-4-hydroxyanthraquinone compounds can be similarly prepared with the use of amines containing aryl and heterocyclic radicals. Another important method for the preparation of 1,4-diaminoanthraquinone compounds involves reacting a leuco-1,4-diaminoanthraquinone compound in which the amino radicals are unsubstituted, with one or two molecular proportions of an organic amine, for example, an amine containing an alkyl radical (i. e., aliphatic chain, or a cycloalkyl or aralkyl radical), an aryl radical, or a heterocyclic radical so as to introduce the residue of the amine into the 1- and/or 4-position of the anthraquinone nucleus.

In any of the above procedures at the completion of the amination reaction, there is obtained an aminoanthraquinone compound in the reduced or leuco form; that is, a leuco-aminoanthraquinone compound. In order to produce the finished dye-stuff or intermediate, it is necessary to convert this leuco aminoanthraquinone compound by oxidation to the corresponding aminoanthraquinone compound. The manner in which a leuco-aminoanthraquinone compound is oxidized to the corresponding aminoanthraquinone compound has an important effect on the efficiency of the process from the standpoint of the quality and yield of the product obtained and also from the standpoint of economy of operation.

It is an object of the present invention to provide an improvement in the process for the manufacture of 1,4-diaminoanthraquinone and 1-amino-4-hydroxyanthraquinone compounds by oxidation of the corresponding leuco derivatives, whereby such compounds may be obtained of excellent quality and in an efficient manner. A more specific object of the invention is to provide a process for converting leuco-1,4-di(alkylamino)anthraquinone compounds in which the alkyl radicals attached to the amino nitrogen atoms in the 1- and 4-positions are different radicals, and leuco-1-alkylamino-4-hydroxyanthraquinone compounds to the corresponding aminoanthraquinone compounds, the said process being characterized by the fact that products are obtained which yield pure shades when applied to materials comprising organic derivatives of cellulose, such as acetyl cellulose.

Other objects of the invention will in part be obvious and will in part appear hereinafter.

It has been found in accordance with the present invention that aminoanthraquinone compounds which contain an amino radical in the 1-position and an amino radical or a hydroxyl radical in the 4-position of the anthraquinone nucleus of excellent quality can be obtained by oxidizing the corresponding leuco-1,4-diaminoanthraquinone and leuco-1-amino-4-hydroxyanthraquinone compounds with an aromatic nitroso compound. The oxidation is carried out while the leuco compound is in solution or suspension in water and/or an organic solvent; for example, an alcohol. Further, it has been found in general the efficiency of the process is increased if an inorganic or organic base is employed in conjunction with the aromatic nitroso compound.

As before indicated, the products obtained as a result of this procedure are in general characterized by their excellent quality. Thus it has been found that the products obtained as a result of oxidizing a leuco compound of the above class in solution or suspension in alcohol with an aromatic nitroso compound and especially with a mixture of an aromatic nitroso compound and an alkali-metal hydroxide are noticeably superior in quality to the products obtained when using an aromatic nitro body alone or an alkali-metal hydroxide alone, as has been previously proposed.

Various types of 1,4-diaminoanthraquinone compounds and 1-amino-4-hydroxyanthraquinone compounds of improved quality and in excellent yields can be prepared by following the process of the present invention. For example, the process can be employed to produce compounds of this class in which the amino radical or radicals are unsubstituted or in which the amino radical or radicals contain substituents of varied classes, including the unsubstituted amino radical; the hydroxyl radical; alkyl radicals, such as methyl, ethyl, amyl, benzyl, phenylethyl, hydroxyethyl, and cyclohexyl radicals; aryl radicals, such as phenyl, tolyl, xylyl, anisidyl, aminophenyl, aminodiphenyl, and naphthyl radicals; and heterocyclic radicals, such as pyridyl and quinolyl radicals. As appears from the foregoing, the alkyl, aryl, and heterocyclic radicals may be unsubstituted or may contain substituents, such as, for example, halogen and hydroxyl, alkyl, alkoxyl, amino, and substituted amino radicals. As specific examples of aminoanthraquinone compounds which can be prepared by the present process the following are mentioned: 1,4-diaminoanthraquinone; 1,4-di(monomethylamino)anthraquinone; 1,4-di(monoethylamino)anthraquinone; 1,4-di(monoethanolamino)anthraquinone; 1,4-di(monobenzylamino)anthraquinone; 1,4-di(monocyclohexylamino)anthraquinone; 1,4-di(monobeta-naphthylamino)anthraquinone; 1,4-di(para-anisidino)anthraquinone; 1,4-di(monoquinolylamino)anthraquinone; 1-monoethylamino-4-monomethylamino-anthraquinone; 1-monoamylamino-4-monomethylamino-anthraquinone; 1-monobenzylamino-4-monomethylamino-anthraquinone; 1-monoethylamino-4-para-toluidino-anthraquinone;_ 1-monomethylamino- or 1-monoethylamino- or 1-monoamylamino- or 1-monobenzylamino-4-hydroxyanthraquinone; 1-para-toluidino-4-para-anisidino-anthraquinone, etc. Further, 1,4-diamino-anthraquinone and 1-amino-4-hydroxyanthraquinone compounds of the above type containing in the 5-, 6-, 7-, and 8-positions additional substituents, such as, for example, halogen and hydroxyl, alkyl, alkoxy, amino, and substituted amino radicals, can be prepared by conversion of the corresponding leuco compounds. It will be understood of course that the advantages resulting from the use of the present process vary in some degree, depending upon the particular leuco compound subjected to oxidation.

The reaction can be carried out in a mixture containing the leuco compound and the aromatic nitroso compound (and the inorganic or organic base, if used), in the presence of water and/or a suitable organic solvent, which assists in bringing the materials into reactive contact. The reaction between a leuco-1,4-dihydroxyanthraquinone compound and ammonia to produce a leuco-diaminoanthraquinone compound, and the reactions between a leuco-1,4-dihydroxyanthraquinone, or a leuco-1-amino-4-hydroxyanthraquinone, or a leuco-1,4-diamino-anthraquinone and an organic amine, to form the corresponding leuco-aminoanthraquinone compounds are frequently carried out in a solvent such as an alcohol. In such cases the oxidation with the aromatic nitroso compound is preferably carried out in the amination reaction mixture. Thus the aromatic nitroso compound and the basic substance, if used, are added directly to the amination reaction mixture. Additional solvent may also be added if desired. The resulting mixture is then maintained at a temperature adapted to cause oxidation to take place in the desired manner. This temperature is preferably the boiling point of the mixture at atmospheric pressure, although higher or lower temperatures may be used. The oxidation may also be accomplished by removing the leuco-aminoanthraquinone compound from the amination reaction mixture in the reduced condition and then forming a solution or suspension of this compound in the selected organic solvent; the addition of the aromatic nitroso compound (and the basic substance if used) being made to the solution or suspension. The oxidized product obtained after completion of the oxidation reaction is insoluble and can be separated from the mixture conveniently by filtration. After washing and drying the filter cake of the aminoanthraquinone compound, the compound obtained is of excellent quality.

The aromatic nitroso compound employed in the process is preferably an aromatic nitroso compound of the benzene series (i. e., containing a single benzene nucleus) such as, for example, a nitrosophenol, a nitrosocresol, and nitrosodimethyl aniline. However, aromatic nitroso compounds of other series, such as, for example, nitrosonaphthol and nitrosodiphenylamine, can be used with satisfactory results. The amount of the aromatic nitroso compound required in the process in cases where an organic solvent is used is ordinarily at least one mol for each mol of the leuco-aminoanthraquinone compound subjected to treatment.

As before stated, the oxidation proceeds, in general, more efficiently if an inorganic or organic base is used in conjunction with the aromatic nitroso compound. The bases preferably used for this purpose are inorganic bases such as sodium hydroxide and potassium hydroxide, or strong organic bases such as piperidine, triethylamine, triethanolamine, and the like. The water-soluble bases are preferably used in the form of their aqueous solutions so as to facilitate their contact with the reacting materials. It has been found that the beneficial effects resulting from the use of a base in the present process can be achieved with the use of a small amount of such a substance. For example, the base may be employed in proportions as low as those corresponding to one per cent or even less of an alkali-metal hydroxide, based on the weight of the leuco-aminoanthraquinone compound subjected to treatment. Although in general an excess of a base does not have a critical effect on the operativeness of the process, an excess is not desirable for economic reasons.

Although water-soluble alcohols are particularly adapted for use as the organic solvent in the process, water and/or any organic solvent which does not adversely affect the reaction and in which the leuco-aminoanthraquinone compound, the aromatic nitroso compound, and the base, if used, are soluble to some extent can be used. Such organic solvents are referred to herein as "suitable organic solvents". The relative value of the organic solvents is dependent principally upon their miscibility with the reacting ingredients. Thus the preferred solvents are those which are miscible with the aromatic nitroso compound and aqueous caustic alkali. For this reason the water-soluble alcohols such as methyl, ethyl, propyl, and butyl alcohol; dioxane; glycols; and glycerol are especially valuable. Other solvents which are of interest in this connection are alcohols of higher molecular weight (such as isoamyl alcohol, normal cetyl alcohol, and benzyl alcohol), chlorbenzene, dichlorbenzene, and toluene. When relatively immiscible solvents are used, such as those last mentioned, vigorous agitation of the reacting mass is essential so as to effect the necessary contact of the reacting materials.

In order that the invention may be more fully understood, reference should be had to the following examples in which are described typical reactions coming within the scope of the invention. It will be understood of course that these examples are given for illustrative purposes merely and are not intended as limitations of the invention. The parts are by weight and the temperatures are in degrees Centigrade.

*Example 1.*—In a suitable vessel fitted with an agitator and reflux condenser, a mixture of 50 parts of leuco-quinizarine, 400 parts denatured alcohol (U. S. specially denatured alcohol, Formula 2B) and 50 parts of a solution of 15 parts methylamine in 35 parts water is agitated and refluxed for about two hours. The reaction mass is then cooled to about 60° and treated with 30 parts para-nitrosophenol, 3 parts of 50 per cent aqueous caustic soda and 80 parts denatured alcohol. The resulting mixture is refluxed at a temperature of about 80° for about 2 hours during which the color of the reaction mass changes from green to deep blue and 1,4-di(methylamino)anthraquinone separates in crystalline form. The reaction mass is cooled to between 10° and 30°; the crystalline product is separated as a cake by filtration, washed first with about 160 parts of denatured alcohol, then with hot water, and finally it is dried in air at about 100°. The 1,4-di(methylamino)anthraquinone so obtained dyes acetate silk greener and brighter shades than are obtainable with the same product when prepared with an aromatic nitro compound alone.

*Example 2.*—A mixture of 50 parts leuco-quinizarine, 400 parts denatured alcohol, and 35 parts of 30 per cent aqueous solution of ethylamine is refluxed for 3.5 hours. The mixture is then cooled to about 60° and to it 40 parts of a 30 per cent aqueous solution of methylamine are added. The mixture is again refluxed for about 2 hours. To the resulting mass, 40 parts of para-nitrosophenol and about 4.5 parts of 50 per cent aqueous caustic soda are added, and refluxing at a temperature of about 80° is continued for about one-half hour, during which the mass is oxidized and changes in color from a brownish green to a deep blue. The reaction mass is cooled to between 10° and 30°, and the crystalline product is separated as a cake by filtration. The cake is washed with about 240 parts denatured alcohol, and dried at about 100°. The product dyes acetyl cellulose bright-greenish-blue shades.

*Example 3.*—50 parts of leuco-1,4-diaminoanthraquinone are suspended in a mixture of about 400 parts of denatured alcohol and 45 parts of a moist aqueous paste of para-nitrosophenol containing 66.7 per cent para-nitrosophenol. The whole mixture is boiled under reflux for about 8 hours (the temperature of the boiling mass being about that of the aqueous alcohol in the mixture). Thereafter, the mixture is cooled and filtered; the filter cake of 1,4-diaminoanthraquinone is washed with alcohol and water, and dried. The dry product is chiefly 1,4-diaminoanthraquinone.

*Example 4.*—A mixture of 50 parts of leuco-quinizarine, 40 parts of monoethanolamine and 500 parts of water is boiled under reflux for about 2 hours. Then 40 parts of a moist aqueous paste of para-nitrosophenol containing 66.7 per cent para-nitrosophenol are added and the mixture is boiled for about 1 hour. The hot mass is filtered and the cake is washed thoroughly with hot water and dried.

The product is obtained in the form of dark, glistening crystals which dissolve in organic solvents, such as alcohol, acetone, solvent naphtha, etc., to clear blue solutions.

*Example 5.*—A mixture of 50 parts of leuco-quinizarine, 30 parts of normal monobutylamine and 400 parts of denatured alcohol is refluxed for 3½ hours; then 40 parts of a 33 per cent aqueous solution of methylamine are added and boiling under reflux of the mixture is continued for about 2 hours longer. The mixture is then cooled to about 60° and 40 parts of a moist aqueous paste of para-nitrosophenol containing 66.7 per cent para-nitrosophenol are added and the mixture is then boiled for about 2 hours. After cooling to about 30° the deep blue crystalline product which consists chiefly of 1-normal-butylamino-4-methylaminoanthraquinone is separated as a cake by filtration. The cake is washed with alcohol and warm water, and dried.

The product dyes acetate silk very bright, clear shades of greenish-blue.

It will be understood that the oxidation procedure described in the above examples may be employed for the preparation of other 1,4-diamino and 1-amino-4-hydroxyanthraquinone compounds, for example, those previously mentioned, by treating the leuco forms of such compounds in the amination reaction masses in which they are formed in the manner described in the examples. Further, as above pointed out, the leuco compounds can be separated from the masses in which they are formed before treatment with the aromatic nitroso compound.

It will further be understood that the conditions for carrying out the oxidation reaction disclosed in the examples can be varied widely within the scope of the invention. For example, the nitrosophenol can be replaced by another aromatic nitroso compound, for example, one of those mentioned above. Further, the amount of caustic soda used in Examples 1 and 2 can be varied, or this material can be replaced by another inorganic or organic base. Also, other suitable organic solvents, e. g., one of those mentioned, can replace the alcohol; or the reaction may be conducted in aqueous suspension.

While the temperature required for effecting the reaction in optimum manner varies, depending upon the specific reactants employed in the reaction, in general it has been found that the use of temperatures varying from 50° to 130° C., and especially from 70° to 130° C., produces best results. The time required to bring the reaction to completion is also a variable factor which is controlled primarily by the temperature at which the reaction is carried out; thus at relatively low temperatures, a relatively long reaction period is required, while at more elevated temperatures the reaction period is correspondingly shortened. As appears from the examples, when an alcohol is used as the solvent and the oxidation reaction is carried out at the boiling point of the mixture, a reaction period of 1 to 3 hours is ordinarily sufficient.

Since certain changes may be made in the above described process without departing from the scope of the invention, it will be understood that the above description should be interpreted as illustrative and not in a limiting sense.

I claim:

1. In the process for converting a leuco-aminoanthraquinone compound containing an amino radical in the 1-position of the anthraquinone nucleus and in the 4-position a radical selected from the group consisting of amino radicals and the hydroxyl radical to the corresponding aminoanthraquinone compound, the improvement which comprises oxidizing the leuco-aminoanthraquinone compound with an aromatic nitroso compound, whereby the corresponding aminoanthraquinone compound is obtained.

2. In the process for converting a leuco-aminoanthraquinone compound containing an amino radical in the 1-position of the anthraquinone nucleus and in the 4-position a radical selected from the group consisting of amino radicals and the hydroxyl radical to the corresponding aminoanthraquinone compound, the improvement which comprises oxidizing the leuco-aminoanthraquinone compound with an aromatic nitroso compound in the presence of an organic solvent which does not adversely affect the reaction and in which the reactants are at least partially soluble, whereby the corresponding aminoanthraquinone compound is obtained.

3. In the process for converting a leuco-aminoanthraquinone compound containing an amino radical in the 1-position of the anthraquinone nucleus and in the 4-position a radical selected from the group consisting of amino radicals and the hydroxyl radical to the corresponding aminoanthraquinone compound, the improvement which comprises oxidizing the leuco-aminoanthraquinone compound with a mixture of an aromatic nitroso compound and a base in the presence of an organic solvent which does not adversely affect the reaction and in which the reactants are at least partially soluble, whereby the corresponding aminoanthraquinone compound is obtained.

4. In the process for converting a leuco-aminoanthraquinone compound containing an amino radical in the 1-position of the anthraquinone nucleus and in the 4-position a radical selected from the group consisting of amino radicals and the hydroxyl radical to the corresponding aminoanthraquinone compound, the improvement which comprises oxidizing the leuco-aminoanthraquinone compound with a mixture of an aromatic nitroso compound and an alkali-metal hydroxide in the presence of an organic solvent which does not adversely affect the reaction and in which the reactants are at least partially soluble, whereby the corresponding aminoanthraquinone compound is obtained.

5. In the process for converting a leuco-aminoanthraquinone compound containing an amino radical in the 1-position of the anthraquinone nucleus and in the 4-position a radical selected from the group consisting of amino radicals and the hydroxyl radical to the corresponding aminoanthraquinone compound, the improvement which comprises oxidizing the leuco-aminoanthraquinone compound with a mixture of an aromatic nitroso compound of the benzene series and an alkali-metal hydroxide in the presence of a water-soluble alcohol, whereby the corresponding aminoanthraquinone compound is obtained.

6. In the process for converting a leuco-aminoanthraquinone compound containing an amino radical in the 1-position of the anthraquinone nucleus and in the 4-position a radical selected from the group consisting of amino radicals and the hydroxyl radical to the corresponding aminoanthraquinone compound, the improvement which comprises oxidizing the leuco-aminoanthraquinone compound with a mixture of an aromatic nitroso compound of the benzene series and an aqueous solution of sodium hydroxide in the presence of a water-soluble alcohol, and recovering the resulting aminoanthraquinone compound.

7. In the process for converting a leuco-aminoanthraquinone compound containing an amino radical in the 1-position of the anthraquinone nucleus and in the 4-position a radical selected from the group consisting of amino radicals and the hydroxyl radical to the corresponding aminoanthraquinone compound, the improvement which comprises oxidizing the leuco-aminoanthraquinone compound with a nitrosophenol.

8. In the process for converting a leuco-amino anthraquinone compound containing an amino radical in the 1-position, a radical selected from the group consisting of amino radicals and the hydroxyl radical in the 4-position, and being free from substituents in the remaining positions of the anthraquinone nucleus to the corresponding aminoanthraquinone compound, the improvement which comprises oxidizing the leuco-aminoanthraquinone compound with a mixture of an aromatic nitroso compound of the benzene series and a base, whereby the corresponding aminoanthraquinone compound is obtained.

9. In the process for converting a leuco-aminoanthraquinone compound containing an amino radical in the 1-position of the anthraquinone nucleus, and in the 4-position a radical selected from the group consisting of amino radicals and the hydroxyl radical to the corresponding aminoanthraquinone compound, the improvement which comprises heating the leuco-aminoanthraquinone compound with a mixture of an aromatic nitroso compound of the benzene series, a small amount of an aqueous solution of an alkali-metal hydroxide, and a water-soluble alcohol at a temperature from 50° to 130° C. until the leuco-aminoanthraquinone compound is oxidized to the corresponding aminoanthraquinone compound.

10. In the process for converting a leuco-aminoanthraquinone compound containing an alkylamino radical in each of the 1- and 4-positions of the anthraquinone nucleus to the corresponding aminoanthraquinone compound, the improvement which comprises oxidizing the leuco-aminoanthraquinone compound to the corresponding aminoanthraquinone with an aromatic nitroso compound, whereby the corresponding aminoanthraquinone compound is obtained.

11. In the process for converting a leuco-aminoanthraquinone compound containing an alkylamino radical in each of the 1- and 4-positions, and being free from substituents in the remaining positions of the anthraquinone nucleus to the corresponding aminoanthraquinone compound, the improvement which comprises oxidizing the leuco-aminoanthraquinone compound at a temperature from 50° to 130° C. with a mixture of para-nitrosophenol and a small amount of an aqueous solution of sodium hydroxide in the presence of a water-soluble alcohol, whereby the corresponding aminoanthraquinone compound is obtained.

12. In the process for converting a leuco-aminoanthraquinone compound containing an alkylamino radical in the 1-position and the hydroxyl radical in the 4-position of the anthraquinone nucleus to the corresponding aminoanthraquinone compound, the improvement which comprises oxidizing the leuco-aminoanthraquinone compound with an aromatic nitroso compound, whereby the corresponding aminoanthraquinone compound is obtained.

13. In the process for converting a leuco-aminoanthraquinone compound containing an alkylamino radical in the 1-position, the hydroxyl radical in the 4-position, and being free from substituents in the remaining positions of the anthraquinone nucleus to the corresponding aminoanthraquinone compound, the improvement which comprises oxidizing the leuco-aminoanthraquinone compound at a temperature from 50° to 130° C. with a mixture of para-nitrosophenol and a small amount of an aqueous solution of sodium hydroxide in the presence of a water-soluble alcohol, whereby the corresponding aminoanthraquinone compound is obtained.

14. In the process of preparing an aminoanthraquinone compound from a leuco-1,4-dihydroxyanthraquinone compound by reacting the leuco-1,4-dihydroxyanthaquinone compound with a member selected from the group consisting of ammonia and amines to form an amination reaction mixture containing a leuco-aminoanthraquinone compound containing an amino radical in the 1-position of the anthraquinone nucleus and in the 4-position a radical selected from the group consisting of amino radicals and the hydroxyl radical, the improvement which comprises introducing an aromatic nitroso compound into the amination reaction mixture, heating the resulting mixture to oxidize the leuco-aminoanthraquinone compound to the corresponding aminoanthraquinone compound, and recovering said corresponding aminoanthraquinone compound.

15. In the process of preparing an aminoanthraquinone compound from a leuco-1,4-dihydroxyanthraquinone compound by reacting the leuco-1,4-dihydroxyanthaquinone compound with a member selected from the group consisting of ammonia and amines in the presence of a water-soluble alcohol to form an amination reaction mixture containing a leuco-aminoanthraquinone compound containing an amino radical in the 1-position of the anthraquinone nucleus and in the 4-position a radical selected from the group consisting of amino radicals and the hydroxyl radical, the improvement which comprises introducing an aromatic nitroso compound of the benzene series and a small amount of an aqueous solution of an alkali-metal hydroxide into the amination reaction mixture, heating the resulting mixture to a temperature from 50° to 130° C. to oxidize the leuco-aminoanthraquinone compound to the corresponding aminoanthraquinone compound, and recovering the corresponding aminoanthraquinone compound.

16. In the process of preparing an aminoanthraquinone compound from a leuco-1,4-diaminoanthraquinone compound in which the amino radicals in the 1- and 4-positions are unsubstituted by reacting the leuco-1,4-diaminoanthraquinone compound with an amine to form an amination reaction mixture containing a leuco-1,4-diaminoanthraquinone compound in which at least one of the amino radicals in the 1- and 4-positions of said first-mentioned leuco-1,4-diaminoanthraquinone compound has been replaced by the residue of the amine, the improvement which comprises introducing an aromatic nitroso compound into the amination reaction mixture, heating the resulting mixture to oxidize said last-mentioned leuco-1,4-diaminoanthraquinone compound to the corresponding 1,4-diaminoanthraquinone compound, and recovering the corresponding 1,4-diaminoanthraquinone compound.

17. In the process of preparing an aminoanthraquinone compound from a leuco-1,4-diaminoanthraquinone compound in which the amino radicals in the 1- and 4-positions are unsubstituted by reacting the leuco-1,4-diaminoanthraquinone compound with an amine in the presence of a water-soluble alcohol to form an amination reaction mixture containing a leuco-1,4-diaminoanthraquinone compound in which at least one of the amino radicals in the 1- and 4-positions of said first-mentioned leuco-1,4-diaminoanthraquinone compound has been replaced by the residue of the amine, the improvement which comprises introducing an aromatic nitroso compound of the benzene series and a small amount of an aqueous solution of an alkali-metal hydroxide into the amination reaction mixture, heating the resulting mixture to a temperature from 50° to 130° C. to oxidize said last-mentioned leuco-1,4-diaminoanthraquinone compound to the corresponding 1,4-diaminoanthraquinone compound, and recovering the corresponding 1,4-diaminoanthraquinone compound.

JAMES OGILVIE.
RICHARD S. WILDER.